US008176398B2

(12) United States Patent
Taunton et al.

(10) Patent No.: US 8,176,398 B2
(45) Date of Patent: *May 8, 2012

(54) DSL TRELLIS ENCODING

(75) Inventors: Mark Taunton, Cambridge (GB); Timothy Martin Dobson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1140 days.

This patent is subject to a terminal disclaimer.

(21) Appl. No.: 11/984,839

(22) Filed: Nov. 21, 2007

(65) Prior Publication Data

US 2008/0137771 A1 Jun. 12, 2008

Related U.S. Application Data

(63) Continuation of application No. 10/949,517, filed on Sep. 27, 2004, now Pat. No. 7,305,608.

(60) Provisional application No. 60/505,720, filed on Sep. 25, 2003.

(51) Int. Cl.
*H03M 13/25* (2006.01)

(52) U.S. Cl. ........................................ 714/786

(58) Field of Classification Search ............ 714/786
See application file for complete search history.

(56) References Cited

U.S. PATENT DOCUMENTS

| | | | |
|---|---|---|---|
| 4,891,823 A * | 1/1990 | Cole | 375/242 |
| 5,369,773 A | 11/1994 | Hammerstrom | |
| 5,612,974 A | 3/1997 | Astrachan | |
| 5,706,312 A * | 1/1998 | Wei | 375/298 |
| 5,719,890 A | 2/1998 | Thomman et al. | |
| 5,768,309 A * | 6/1998 | Olafsson | 375/221 |
| 5,809,493 A | 9/1998 | Ahamed et al. | |
| 5,909,427 A | 6/1999 | Manning et al. | |
| 5,931,965 A | 8/1999 | Alamouti | |
| 5,954,836 A | 9/1999 | Wang | |
| 6,061,449 A | 5/2000 | Candelore et al. | |
| 6,081,921 A | 6/2000 | Simanapalli | |
| 6,182,265 B1 | 1/2001 | Lim et al. | |
| 6,314,102 B1 | 11/2001 | Czerwiec et al. | |
| 6,442,729 B1 | 8/2002 | Kim et al. | |
| 6,448,910 B1 | 9/2002 | Lu | |
| 6,570,927 B1 | 5/2003 | Van Stralen et al. | |
| 6,577,678 B2 | 6/2003 | Scheuermann | |
| 6,631,488 B1 | 10/2003 | Stambaugh et al. | |
| 6,697,994 B2 | 2/2004 | Ishikawa | |
| 6,754,283 B1 | 6/2004 | Li | |
| 6,915,472 B1 | 7/2005 | Jones, IV et al. | |
| 7,039,852 B2 | 5/2006 | Dent | |
| 7,055,088 B2 | 5/2006 | Betts | |

(Continued)

OTHER PUBLICATIONS

Splitterless asymmetric digital subscriber line transceivers 2 (splitterless ADSL2), International Telecommunications Union (ITU-T Recommendation G.992.4), 24 pages, Jul. 2002.

(Continued)

*Primary Examiner* — Stephen Baker
(74) *Attorney, Agent, or Firm* — Sterne, Kessler, Goldstein & Fox P.L.L.C.

(57) ABSTRACT

A method is used that substantially simultaneously trellis encodes data to be modulated onto multiple tones. The embodiments of the present invention comprise the steps of: (a) using a first input operand comprising state bits for a first trellis stage; (b) using a second input operand comprising a plurality of input data bits; and (c) generating an output comprising output data bits and output state bits from a first or later trellis stage.

21 Claims, 3 Drawing Sheets

U.S. PATENT DOCUMENTS

| | | |
|---|---|---|
| 7,139,305 B2 | 11/2006 | Gavnoudias et al. |
| 7,154,895 B1 | 12/2006 | Bornemisza et al. |
| 7,199,740 B1 | 4/2007 | Ferguson et al. |
| 7,305,567 B1 | 12/2007 | Hussain et al. |
| 7,305,608 B2 | 12/2007 | Taunton et al. |
| 2001/0008001 A1 | 7/2001 | Suemura |
| 2002/0124154 A1 | 9/2002 | Stacey et al. |
| 2003/0016670 A1 | 1/2003 | Seidl et al. |
| 2003/0091109 A1 | 5/2003 | Okunev et al. |
| 2003/0190910 A1 | 10/2003 | Scheuermann |
| 2003/0225949 A1 | 12/2003 | Hoang et al. |
| 2004/0025104 A1 | 2/2004 | Amer |
| 2005/0068957 A1 | 3/2005 | Taunton et al. |
| 2005/0068958 A1 | 3/2005 | Taunton et al. |
| 2005/0068959 A1 | 3/2005 | Taunton et al. |
| 2005/0069134 A1 | 3/2005 | Taunton et al. |
| 2005/0084104 A1 | 4/2005 | Taunton et al. |
| 2005/0094551 A1 | 5/2005 | Taunton et al. |
| 2005/0100111 A1 | 5/2005 | Taunton et al. |

OTHER PUBLICATIONS

Asymmetric digital subscriber line (ADSL) transceivers, International Telecommunications Union (ITU-T Recommendation G.992.1), 256 pages, Jun. 1999.

Splitterless asymmetric digital subscriber line (ADSL) transceivers, International Telecommunication Union (ITU-T Recommendation G.992.2), 179 pages, Jun. 1999.

Asymmetric digital subscriber line transceivers 2 (ADSL2), International Telecommunication Union (ITU-T Recommendation G.992.3), 436 pages, Jan. 2005.

International Telecommunications Union, "Integrated Services Digital Network (ISDN) ISDN User Network Interfaces", ITU-T Recommendation I.432, Mar. 1993, all pages.

\* cited by examiner

| OPCODE | DESTINATION | SOURCE 1 | SOURCE 2 |
|---|---|---|---|

FIG.3A

| DSLTE | STATE OUT/ DATA OUT | STATE IN | DATA IN |
|---|---|---|---|

FIG.3B

DSL TRELLIS ENCODING

RELATED APPLICATIONS

This application is a continuation of application Ser. No. 10/949,517, filed Sep. 27, 2004 now U.S. Pat. No. 7,305,608, which claims the benefit of U.S. provisional application No. 60/505,720, filed on Sep. 25, 2003, both of which are incorporated by reference herein in its entirety.

FIELD OF THE INVENTION

The present invention relates generally to Digital Subscriber Line ("DSL") systems, trellis encoding, and the design of instructions for processors. More specifically, the present invention relates to a system, method and processor instruction for DSL trellis encoding.

BACKGROUND OF THE INVENTION

Trellis encoding is a way of encoding data using a convolutional code prior to modulation such that the original data can be recovered at the receiver, even in the presence of a certain amount of noise on the received signal.

In national and international standards for DSL (digital subscriber line) technologies such as ADSL (e.g., ITU-T Recommendation G992.1 entitled "Asymmetrical digital subscriber line (ADSL) transceivers," ITU-T Recommendation G992.3 entitled "Asymmetric digital subscriber line transceivers-2 (ADSL2)," and ITU-T Recommendation G992.4 entitled "Splitterless asymmetric digital subscriber line transceivers 2 (splitterless ADSL2)" which are all incorporated by reference herein in their entireties) a particular form of trellis encoding is used for mapping a set of input data bits $U=\{u_1, u_2, \ldots, u_z\}$ and input state bits $S=\{s_0, s_1, s_2, s_3\}$ onto two sets of output data bits $V=\{v_0, v_1, \ldots, v_{x-1}\}$, $W=\{w_0, w_1, \ldots, w_{y-1}\}$ and output state bits $S'=\{s'_0, s'_1, s'_2, s'_3\}$. V and W are subsequently encoded using QAM (quadrature amplitude modulation) onto a pair of tones in a DMT (discrete multitone) scheme, the two tones being encoded with respectively x-bit and y-bit QAM constellations. (Note that x+y=z+1; in other words, one more bit is produced in the V and W output data bits than were taken in as input data bits U). The process is then repeated with S' forming the input state for the trellis encoding of the next set of input data bits U' for the next tone-pair, yielding output data bits V' and W', and output state bits S", and so on.

According to the applicable standards, the equations governing the output are as follows:

$v_0 = u_3$ $v_1 = u_1 \wedge u_3$ $v_n = u_{n+2}$, for n=2 to (x-1)

$w_0 = u_2 \wedge u_3$ $w_1 = s_0 \wedge u_1 \wedge u_2 \wedge u_3$ $w_n = u_{n+x}$, for n=2 to (y-1)

$s'_0 = s_1 \wedge s_3 \wedge u_1$ $s'_1 = s_2 \wedge u_2$ $s'_2 = s_0$ $s'_3 = s_1$ The symbol '$\wedge$' represents the logical exclusive-OR operation.

An alternative naming scheme used hereafter is for input U to be identified as U(0), U' as U(1), etc., output V to be identified as V(1), V' as V(2), etc., output W to be identified as W(1), W' as W(2), etc., input S to be identified as S(0), output or input S' to be identified as S(1), output or input S" to be identified as S(2) etc.

In older designs for transmission systems using trellis encoding (such as DSL modems), which are in general more hardware oriented, the trellis encoding of data, for subsequent modulation of tones for transmission, is typically performed by fixed-function logic circuits. However, such system designs are commonly hard to adapt for varying application requirements. In order to increase flexibility in modem development and application, it has become more common to use software to perform the various functions in a DMT-based transmitting device. As the various performance levels (such as data-rates) required of such devices increase, the pressure on the software to perform efficiently the individual processing tasks (such as trellis encoding), which make up the overall transmitter function, likewise increases.

One reason is that performing the trellis encoding operation purely in software is typically quite complex to implement. Using conventional instructions (e.g. bit-wise shift, bit-wise and, bit-wise exclusive-OR, etc.) may take many cycles, or even tens of cycles, to perform trellis encoding for a single tone-pair. In some circumstances there may be hundreds or even thousands of tones for which the associated data bits must be encoded, per transmitted symbol, and several thousand symbols per second may need to be transmitted.

The trellis encoding process can therefore represent a significant proportion of the total computational cost for a software-based DMT transmitter, especially in the case of a system where one processor handles the operations for multiple independent transmission channels (e.g., in a multi-line DSL modem in the central office). With increasing workloads (in respect of the average number of tones used in each transmission channel), it becomes necessary to improve the efficiency of trellis encoding of data in such software-based DMT transmitters.

Therefore, what is needed is a system and method that significantly reduce a number of cycles needed for software to perform trellis encoding of data in accordance with a mapping scheme specified in international standards.

SUMMARY OF THE INVENTION

According to the present invention, these objects are achieved by a system and method as defined in the claims. The dependent claims define advantageous and preferred embodiments of the present invention.

The embodiments of the present invention provide a method, apparatus and processing instruction for trellis encoding data for subsequent modulation onto one or more tone-pairs. In general, the present invention comprises the steps of: (a) using a first input operand comprising input state bits; (b) using a second input operand comprising a plurality of input data bits; and (c) generating an output comprising trellis-encoded data bits and output state bits from a trellis encoding stage.

In one embodiment, the first input operand comprises a value of at least four bits (e.g. 16 bits, 32 bits or 64 bits) and the second input operand comprises a value of at least 30 bits (e.g. 32 bits, or 64 bits). Four bits of the first input operand may comprise the input state bits S(0) for a trellis stage. The second input operand comprises the input data bits U(0). The output comprises 2 outputs: a state output comprising the state bits S(1) from the trellis encoding stage and a data output comprising data bits V(1) and W(1). In this embodiment, the present invention performs the trellis encoding for one pair of tones.

In another embodiment, the first and second input operands each comprise a 64-bit value. Four bits of the 64-bits of the first input operand may comprise the input state bits S(0) for a first trellis stage. The second input operand comprises a first and second field of 32-bits each, and the first field comprises the input data bits U(0) for a first trellis stage, and the second field comprises the input data bits U(1) for a second trellis stage. The output comprises two 64-bit outputs: a state output comprising the state bits S(2) from a second trellis stage and a data output comprising data bits V(1) and W(1) from a first trellis stage, and data bits V(2) and W(2) from a second trellis stage. In this embodiment, the present invention performs the trellis encoding substantially simultaneously for two pairs of tones (i.e. four tones).

Further embodiments, features, and advantages of the present inventions, as well as the structure and operation of the various embodiments of the present invention, are described in detail below with reference to the accompanying drawings.

BRIEF DESCRIPTION OF SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 3A illustrates an instruction format for a three-operand instruction supported by the processor in accordance with one embodiment of the present invention.

FIG. 3B illustrates an instruction format for trellis encoding in accordance with one embodiment of the present invention.

DETAILED DESCRIPTION OF THE INVENTION

Figure 1:
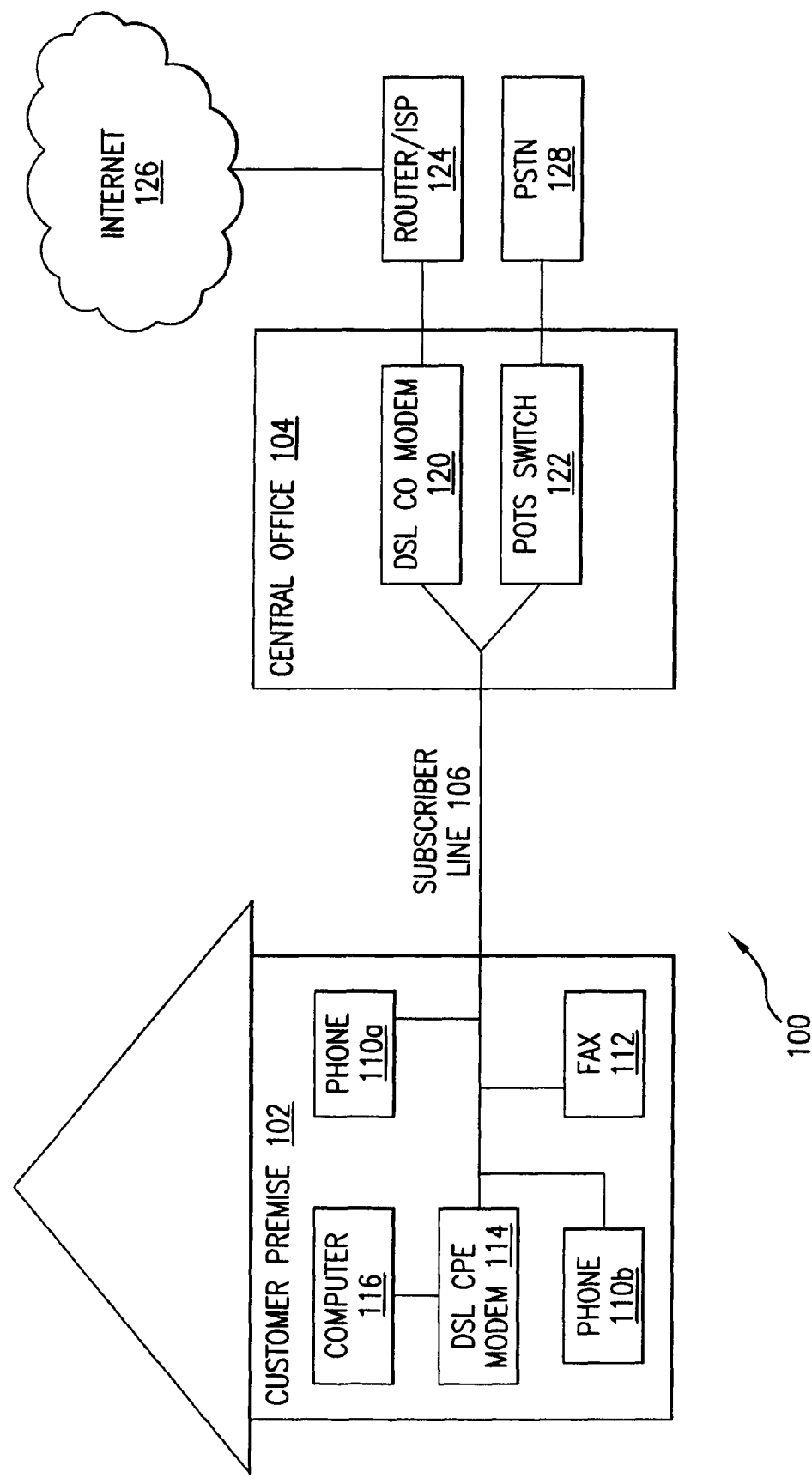
FIG. 1 illustrates a block diagram of a communications system in accordance with the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

Embodiments of the present invention provide an instruction or an instruction mechanism ("the instruction mechanism") that significantly reduces a number of cycles needed to perform to perform trellis encoding of data by a processor. In one embodiment, the trellis encoding of data is done in accordance with the mapping scheme specified in international standards for DSL. It is to be appreciated this present invention can be used in other applications of DMT transmission where the same mapping scheme is used. A simple embodiment of the invention can implement the trellis encoding process of data for modulation onto one pair of tones. However, one skilled in the art will appreciate that the present invention is not restricted to this number of tones but may be used to trellis encode data to be modulated onto any number of tones or tone-pairs. For example, through the application of SIMD techniques and the combination of multiple instances of the basic trellis encoding equations (i.e. multiple stages of trellis encoding) described in more detail below, the instruction mechanism can directly implement the trellis encoding process substantially simultaneously for two or more encoding stages. For the case of encoding data for two pairs of tones, the trellis-encoding stages can be represented by:

Stage 1: (U(0), S(0))→(V(1), W(1), S(1)) (U(0) is z bits long, V(1) is x bits, W(1) is y bits)

Stage 2: (U(1), S(1))→(V(2), W(2), S(2)) (U(1) is z' bits long, V(2) is x' bits, W(2) is y' bits)

As used herein, the notation S(0) represents the state input bits for a first trellis stage and S(N) represents the state output of the Nth stage for an N-tone-pair version. Thus, for example, S(1) represents the state output bits from a first trellis stage, and S(2) represents the state output bits from a second trellis stage. For the input data bits, U, the notation U(0) represents the data input bits for a first trellis stage and the notation U(1) represents the data input bits for a second trellis stage. The notation V(N) and W(N) represent the data output bits of the Nth stage for an N-tone-pair version. Thus, for example, V(1) and V(2) represent the data output bits from a first and second trellis stage respectively, and W(1) and W(2) represent the data output bits from a first and second trellis stage respectively.

In general, the present invention provides a method, apparatus and processing instruction for substantially simultaneously trellis encoding data for subsequent modulation onto a plurality of tones by: (a) using a first input operand comprising input state bits for a first trellis stage; (b) using a second input operand comprising a plurality of input data bits; and (c) generating an output comprising (i) output data bits, and (ii) output state bits from a first or later trellis stage.

In one embodiment, the trellis encoding instruction mechanism takes as one input a 64-bit value comprising the input state bits S(0) for the first trellis stage, and as a second input a 64-bit value comprising two 32-bit fields wherein each field contains the U bits to be encoded for a respective trellis stage (i.e. a first field contains U(0) bits for the first trellis stage and the second field contains U(1) bits for the second trellis stage), and produces two outputs. The first output value is a 64-bit value comprising the four output state bits S(2) from the second trellis stage, along with 60 other bits which are unused. The second output value is also 64-bits comprising the V(1) and W(1) outputs from the first trellis stage, and the V(2) and W(2) outputs from the second stage, respectively.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the invention are discussed below with references to FIGS. 1 to 3. However, those skilled in the art will readily appreciate that the detailed description given herein with respect to these figures is for explanatory purposes as the invention extends beyond these limited embodiments.

Referring now to FIG. 1, there is shown a block diagram of a communications system 100 in accordance with one embodiment of the present invention. System 100 provides traditional voice telephone service (plain old telephone service—POTS) along with high speed Internet access between a customer premise 102 and a central office 104 via a subscriber line 106. At the customer premise end 102, various customer premise devices may be coupled to the subscriber line 106, such as telephones 110a, 110b, a fax machine 112, a DSL CPE (Customer Premise Equipment) modem 114 and the like. A personal computer 116 may be connected via DSL CPE modem 114. At the central office end 104, various central office equipment may be coupled to the subscriber line 106, such as a DSL CO (Central Office) modem 120 and a POTS switch 122. Modem 120 may be further coupled to a router or ISP 124 which allows access to the Internet 126. POTS switch 122 may be further coupled to a PSTN 128.

In accordance with one embodiment of the present invention, system 100 provides for data to be sent in each direction as a data stream between the central office 104 and the customer premise 102 via subscriber line 106. As data is sent from the central office 104 to the customer premise 102, the DSL CO modem 120 at the central office 104 can trellis encode the data in accordance with the principles of the present invention before modulating and transmitting the data via subscriber line 106. Similarly, when data is sent from the customer premise 102 to the central office 104, the DSL CPE modem 114 at the customer premise 102 can trellis encode the data in accordance with the principles of the present invention before modulating and transmitting the data via subscriber line 106. In a preferred embodiment, DSL CO modem 120 incorporates a BCM6411 or BCM6510 device, produced by Broadcom Corporation of Irvine, Calif., to implement its various functions.

Figure 2:
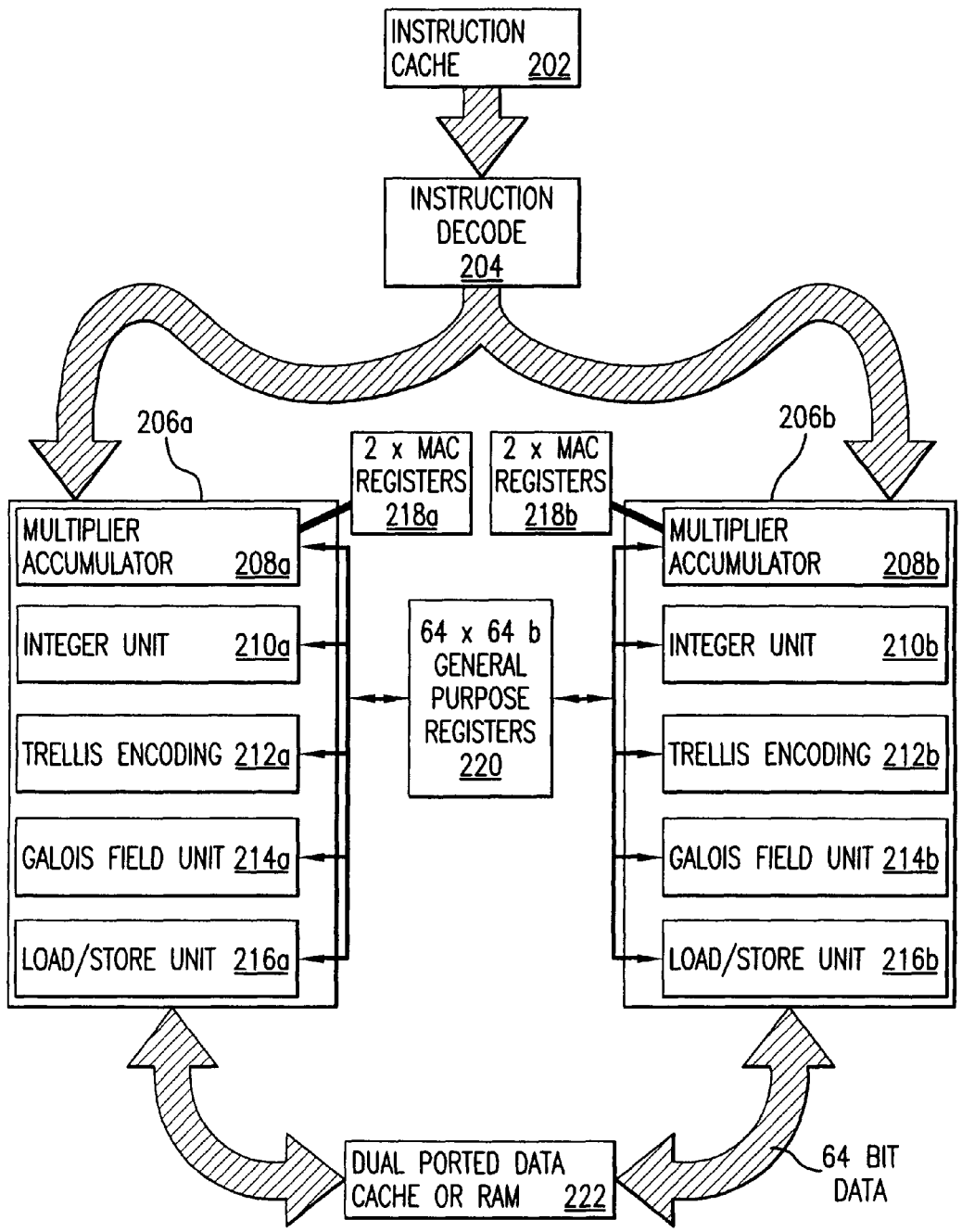
FIG. 2 illustrates a block diagram of a processor in accordance with one embodiment of the present invention.

Referring now to FIG. 2, there is shown a schematic block diagram of the core of a modem processor 200 in accordance with one embodiment of the present invention. In a preferred embodiment, processor 200 is the Broadcom FirePath processor used in the BCM6411 and BCM6510 devices. The processor 200 is a 64 bit long instruction word (LIW) machine consisting of two execution units 206a, 206b. Each unit 206a, 206b is capable of 64 bit execution on multiple data units, (for example, four 16 bit data units at once), each controlled by half of the 64 bit instruction. The execution units, 206a, 206b, may include single instruction, multiple data (SIMD) units.

SIMD stands for "Single Instruction Multiple Data" and describes a style of digital processor design in which a single instruction can be issued to control the processing of multiple data values in parallel (all being processed in the same manner). SIMD operations can be implemented in a digital processor, such as Broadcom's FirePath digital processor design, by data processing units which receive multiple input values, each 64 bits wide but capable of being logically subdivided into and treated as multiple smaller values e.g. 8×8-bit values, 4×16-bit values, or 2×32-bit values.

To illustrate SIMD working as used in FirePath, consider the FirePath instruction:

ADDH c, a, b

The instruction mnemonic ADDH is an abbreviation for "Add Half-words." The instruction "ADDH c, a, b" takes as input two 64-bit operands from registers a and b, and writes its result back to register c. ADDH performs four 16-bit ("half-word") additions: each 16-bit value in a is added to the corresponding 16-bit value within b to produce 4×16-bit results in the 64-bit output value c. Thus, this SIMD method allows for a great increase in computational power compared with earlier types of processors where an instruction can only operate on a single set of input data values (e.g. one 16-bit operand from a, one 16-bit operand from b giving one 16-bit result in c). For situations where the same operation is to be performed repeatedly across an array of values, which is common in digital signal processing applications, it allows in this instance an increase in speed by a factor of four of the basic processing rate, since four add operations can be performed at once rather than only one.

Processor 200 also includes an instruction cache 202 to hold instructions for rapid access, and an instruction decoder 204 for decoding the instruction received from the instruction cache 202. Processor 200 further includes a set of MAC Registers 218a, 218b, that are used to improve the efficiency of multiply-and-accumulate (MAC) operations common in digital signal processing, sixty four (or more) general purpose registers 220 which are preferably 64 bits wide and shared by execution units 206a, 206b, and a dual ported data cache or RAM 222 that holds data needed in the processing performed by the processor. Execution units 206a, 206b further comprise multiplier accumulator units 208a, 208b, integer units 210a, 210b, trellis encoding units 212a, 212b, Galois Field units 214a, 214b, and load/store units 216a, 216b.

Multiplier accumulator units 208a, 208b perform the process of multiplication and addition of products (MAC) commonly used in many digital signal processing algorithms such as may be used in a DSL modem.

Integer units 210a, 210b, perform many common operations on integer values used in general computation and signal processing.

Galois Field units 214a, 214b perform special operations using Galois field arithmetic, such as may be executed in the implementation of the well-known Reed-Solomon error protection coding scheme.

Load/store units 216a, 216b perform accesses to the data cache or RAM, either to load data values from it into general purpose registers 220 or store values to it from general purpose registers 220. They also provide access to data for transfer to and from peripheral interfaces outside the core of processor 200, such as an external data interface for ATM cell data.

Trellis encoding units 212a, 212b directly implement the trellis encoding process for the processor 200. These units may be instantiated separately within the processor 200 or may be integrated within another unit such as the integer unit 210. In one embodiment, each trellis encoding unit 212a, 212b receives a first input operand comprising the input state bits S(0) for a first trellis stage, a second input operand comprising the input data U bits (i.e. input data bits U(0) for a first trellis stage and input data U(1) bits for a second trellis stage), and generates an output comprising output state bits S(1) and data output bits V(1), W(1), V(2), W(2).

Referring now to FIG. 3A, there is shown an example of an instruction format for a three-operand instruction supported by the processor 200. In one embodiment, the instruction format includes 14 bits of opcode and control information, and three six-bit operand specifiers. As will be appreciated by one skilled in the art, exact details such as the size of the instruction in bits, and how the various parts of the instruction are laid out and ordered within the instruction format, are not themselves critical to the principles of present invention: the parts could be in any order as might be convenient for the implementation of the instruction decoder 204 of the processor 200 (including the possibility that any part of the instruction such as the opcode and control information may not be in a single continuous sequence of bits such as is shown in FIG. 3). The operand specifiers are references to registers in the set of general purpose registers 220 of processor 200. The first of the operands is a reference to a destination register for storing the results of the instruction. The second operand is a reference to a first source register for the instruction, and the third operand is a reference to a second source register for the instruction.

Referring now to FIG. 3B, there is shown an example of a possible instruction format for an instruction to perform trellis encoding in accordance with mapping schemes specified in international or national DSL standards supported by processor 200 in accordance to the present invention. The mnemonic for the opcode is shown as "DSLTE", where DSLTE stands for DSL Trellis Encode. The actual mnemonic used is incidental; for example in another embodiment, an alternative mnemonic for the same instruction might be "ADSLTE", since the trellis encoding scheme discussed above was first specified for ADSL modems. Again it should be observed that exact details of how this instruction format is implemented—the size, order and layout of the various parts of the instruction, exact codes used to represent the DSLTE opcode, etc.—are not critical to the principles of the present invention. The DSLTE instruction uses the three-operand instruction format shown in FIG. 3A, and in one embodiment, is defined to take three six-bit operand specifiers. The first of the operands is a reference to a pair of 64-bit destination registers for an output "stateout/dataout" where the results of the DSLTE instruction are stored. The second operand is a reference to a first source register for a first input "statein" from which state input bits are read, and the third operand is a reference to a source register for the second input "datain" from which input data bits are read. One skilled in the art will realize that the present invention is not limited to any specific register or location for those registers but that the instruction of the present invention may refer to an arbitrary register in the general purpose registers 220.

Thus, by means of this generality of specification, the present invention advantageously achieves great flexibility in the use of the invention. For example, the present invention enables the original data, which is to be trellis encoded, to be obtained from any location chosen by the implementor (e.g. by first loading that data from the memory 222 into any convenient register, or it may already be in a register as a result of a previous processing operation). Likewise, the resulting trellis encoded data may be placed anywhere convenient for further processing such as in some general purpose register 220 for immediate further operations, or the resulting trellis encoded data may be placed back in memory 222 for later use. Thus, the flexibility of the present invention is in sharp contrast to conventional (hardware) implementations of the trellis encoding function, where the data flow is fixed in an arrangement dictated by the physical movement of data through the hardware, and cannot be adapted or modified to suit different modes of use.

Similarly, the arrangement and use of separate 'state' data values is completely unconstrained, but may be arranged according to preference and passed in and out for each invocation of the instruction. Thus, the flexibility of the present invention is in sharp contrast to conventional (hardware) implementations of the trellis encoding function, where the data flow is fixed in an arrangement dictated by the physical movement of data through the hardware, and cannot be adapted or modified to suit different modes of use. For example, typically in such hardware contexts the 'state' (successive values of S) is held internally within the trellis encoding hardware, rather than being passed in as and when trellis encoding is required. This means that re-using a hardware implementation to trellis encode multiple distinct data streams at the same time is either impossible, or certainly more complex to implement, since some arrangement must be made to allow the individual states for the different streams to be swapped in and out.

In one embodiment, the trellis encoding instruction is used in the software on a processor chip or chip-set implementing a central-office modem end of a DSL link (e.g. ADSL or VDSL). However, one skilled in the art will realize that the present invention is not limited to this implementation, but may be equally used in other contexts where data must be trellis encoded in a substantially similar way, such as in a DSL CPE modem at the customer premise, or in systems not implementing DSL.

In one embodiment, the DSLTE instruction takes as one input a 64-bit value comprising the input state bits S(0) for the first trellis stage. In one embodiment of the first input, only the least significant four bits are used to represent the input state bits. However, one skilled in the art will realize that the principles of the present invention are not linked to this arrangement but that the input state bits may be organized in other ways. The second input operand is also 64 bits in size and comprises the U bits to be encoded. In one embodiment, the second input operand comprises two word fields, where a word is a 32-bit quantity. One word (e.g. the lower (least-significant) word) may contain the U bits for a first trellis stage (U(0)), and the other word (e.g. the upper (most-significant) word) may contain the U bits for a second trellis stage (U(1)). The U bits in each field may be between 3 and 31 bits in length. In another embodiment, simplification of the implementation of this instruction mechanism can be achieved through the use of U bits that are not in a contiguous subset of bits within each respective word field, but instead are each partitioned into two contiguous subsets which are presented aligned at the least-significant (right-hand) end of each of the two 16-bit ("half-word") fields which make up the word field. For example, the lower half-word of each word field can contain bits $\{u_1, u_2, \ldots, u_{x+1}\}$ of the respective U bits (U(0) or U(1)) and the upper half-word can contain bits $\{u_{x+2}, u_{x+3}, \ldots, u_z\}$ of the respective U bits. By splitting each of the U(0) and U(1) inputs in this way, the instruction mechanism does not need to take account of the values of x, y, x', y' (the lengths of the respective sections of U(0) and U(1)). In this embodiment, the U bits in each word field may be between 3 and 30 bits in total, with up to 16 U bits in the lower half-word and up to 14 U bits in the upper half-word. As with the arrangement of data in the first input operand, one skilled in the art will realize that the arrangement of the U bits is not limited to this description, but may be organized in other ways as well.

The output of the instruction comprises two outputs: a first output value comprising the output state bits S(2) from the second trellis stage, and a second output value containing V(1), W(1), V(2) and W(2). In one embodiment, the first output value comprises 64-bits, of which only the bottom four bits contain the output state bits. In an embodiment, the second output value comprises 64-bits, organized as four half-words (16-bit quantities), containing V(1), W(1), V(2), W(2) respectively with each field aligned to the bottom (least-significant end) of its respective half-word. Again, as with the first and second input operands, one skilled in the art will realize that the outputs of the present invention are not limited to the arrangement described above, but may be organized in other ways as well.

In operation, the instruction mechanism is implemented in a processor, such that the instruction mechanism performs a multi-stage (such as 2-stage) trellis encoding process for data to be modulated onto a plurality of tones (such as 4 tones) in a single operation whose execution is initiated and can also be completed during one cycle. In contrast, conventionally a processor required the execution of at least 10 operations, over multiple cycles, in order to trellis-encode 4 tones. Therefore, the instruction mechanism of the present invention significantly increases the efficiency of trellis encoding of data for subsequent modulation and transmission.

The core operation performed by the DSLTE instruction mechanism for 64-bit first and second input operands as discussed above is described by the following abstract logic description:

stateout.0=statein.1 ^statein.2 ^datain.1 ^datain.32 stateout.1=statein.0 ^datain.33 stateout.2=statein.1 ^statein.3 ^datain.0 stateout.3=statein.2 ^datain.1 stateout.<63..4>=ZEROS(60)

dataout.0=datain.2 dataout.1=datain.0 ^datain.2 dataout.<14..2>=datain.<15..3> dataout.15=0 dataout.16=datain.1 ^datain.2 dataout.17=statein.0 ^datain.0 ^datain.1 ^datain.2 dataout.<31..18>=datain.<29..16> dataout.32=datain.34 dataout.33=datain.32 ^datain.34 dataout.<46..34>=datain.<47..35> dataout.47=0 dataout.48=datain.33 ^datain.34 dataout.49=statein.1 ^statein.3 ^datain.0 ^datain.32 ^datain.33 ^datain.34 dataout.<63..50>=datain.<61..48>

In the above abstract logic description:

the inputs are statein and datain, in which statein.0 holds $S(0)_0$, statein.1 holds $S(0)_1$, statein.2 holds $S(0)_2$, statein.3 holds $S(0)_3$, datain.<31..0> holds U(0) and datain.<63..32> holds U(1);

the outputs are stateout and dataout, in which stateout.0 receives $S(2)_0$, stateout.1 receives $S(2)_1$, stateout.2 receives $S(2)_2$, stateout.3 receives $S(2)_3$, dataout.<15..0> receives V(1), dataout.<31..16> receives W(1), dataout.<47..32> receives V(2) and dataout.<63..48> receives W(2).

In the above description the following definitions apply:

val.n (where val is an identifier for a linear bit sequence of one or more bits, such as statein, dataout, etc., and n is a constant such as 5) means bit n of value val; bit 0 is the least significant bit, and bit 1 is the next more significant bit, etc.

ZEROS(s) means the linear bit sequence of length s in which all bits are 0.

val.<m..n> (where val is an identifier for a linear bit sequence and m and n are constants or constant expressions and m≧n) means the linear bit sequence SEQ (val.m, val.(m−1), . . . val.n).

SEQ(a,b, . . . z) means the linear bit sequence resulting from the concatenation of the listed bit values a, b, . . . z, where bit a becomes the most significant bit, b the next most significant bit, etc, and z the least significant bit of the resulting sequence. The length of the sequence is equal to the number of bit values in the list.

The above abstract logic description is only one of many possible ways to define logic circuitry to achieve the desired function. The logical combination of the various input bits to produce the output bits can be defined in other ways, for example by sharing the calculation of common sub-expressions of the above logic equations such as "statein.1 ^statein.3 ^datain.0" which appears both as the equation for stateout.2 and as part of the equation for dataout.49. Therefore the above abstract logic description is given by way of example only, and other descriptions can be used as well. One way in which the current invention may be implemented in the context of a semiconductor chip is by use of logic synthesis tools (such as the software program 'BuildGates' by Cadence Design Systems, Inc.) to create a logic circuit implementing the core function of the DSLTE instruction as defined above. Such tools take as input a high-level definition in a formal definition language such as Verilog or VHDL; such languages have a general character comparable to the above abstract logic description, though differing in detail. A skilled artisan can readily use the above abstract logic description to create such a high-level definition and thereby create a logic circuit using such tools.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for trellis encoding data for subsequent modulation onto one or more pairs of tones, the method comprising:

receiving a first operand including state input bits for a first trellis stage;

receiving a second operand including data input bits for a plurality of trellis stages, the plurality of trellis stages including the first trellis stage and a final trellis stage; and generating a trellis encoded output for subsequent modulation onto the one or more pairs of tones based on the first operand, the second operand, and data output bits, wherein the trellis encoded output comprises state output bits from the final trellis stage, wherein the data output bits include a plurality of sets of data output bits from the plurality of trellis stages, and wherein the plurality of sets of data output bits from the plurality of trellis stages are generated substantially simultaneously.

2. The method of claim 1, wherein the step of generating the trellis encoded output for subsequent modulation onto the one or more pairs of tones comprises:

modulating the trellis encoded output for subsequent modulation onto two pairs of tones.

3. The method of claim 2, wherein the step of generating the trellis encoded output comprises:
   generating a first 64-bit value for a first set of data output bits and a second 64-bit value for a second set of data output bits.

4. The method of claim 2, wherein the step of generating the trellis encoded output comprises:
   generating state bits S(2) for the state output bits.

5. The method of claim 2, wherein the step of generating the trellis encoded output comprises:
   generating data output bits V(1), W(1) for a first set of data output bits and data output bits V(2), W(2) for a second set of data output bits.

6. The method of claim 2, wherein the step of receiving the first operand comprises:
   receiving a 64-bit value for the first operand.

7. The method of claim 6, wherein the step of receiving the 64-bit value for the first operand comprises:
   receiving the 64-bit value including a 4-bit value for the state input bits for the first operand.

8. The method of claim 2, wherein the step of receiving the second operand comprises:
   receiving a 64-bit value for the second operand.

9. The method of claim 8, wherein the step of receiving the 64-bit value for the second operand comprises:
   receiving a first field of 32-bits and a second field of 32-bits for the second operand.

10. The method of claim 9, wherein the step of receiving the first field of 32-bits and the second field of 32-bits for the second operand comprises:
    receiving U(0) bits for the first field and U(1) bits for the second field.

11. An instruction mechanism to trellis encode data for subsequent modulation onto one or more pairs of tones, comprising:
    an instruction decoder configured to receive a single instruction; and
    an execution unit configured to trellis encode data for subsequent modulation onto the one or more pairs of tones in response to the single instruction, the trellis encoding including:
      receiving a first operand including state input bits for a first trellis stage,
      receiving a second operand including data input bits for a plurality of trellis stages, the plurality of trellis stages including the first trellis stage and a final trellis stage, and
      generating a trellis encoded output for subsequent modulation onto the one or more pairs of tones based on the first operand, the second operand, and data output bits,
    wherein the trellis encoded output includes state output bits from the final trellis stage,
    wherein the data output bits include a plurality of sets of data output bits from the plurality of trellis stages, and
    wherein the plurality of sets of data output bits from the plurality of trellis stages are generated substantially simultaneously.

12. The instruction mechanism of claim 11, wherein the execution unit is configured to generate the trellis encoded output for subsequent modulation onto two pairs of tones.

13. The instruction mechanism of claim 12, wherein a first set of data output bits comprises a first 64-bit value and a second set of data output bits comprises a second 64-bit value.

14. The instruction mechanism of claim 12, wherein the state output bits comprises state bits S(2).

15. The instruction mechanism of claim 12, wherein a first set of data output bits comprises data output bits V(1), W(1) and a second set of data output bits comprises data output bits V(2), W(2).

16. The instruction mechanism of claim 12, wherein the execution unit comprises:
    an encoding unit configured to trellis encode the data,
    wherein the trellis encoding unit is configured to generate the trellis encoded output for subsequent modulation onto the one or more pairs of tones.

17. The instruction mechanism of claim 12, wherein the first operand comprises a 64-bit value.

18. The instruction mechanism of claim 17, wherein the 64-bit value comprises a 4-bit value for the state input bits for the first operand.

19. The instruction mechanism of claim 12, wherein the second operand comprises a 64-bit value.

20. The instruction mechanism of claim 19, wherein the 64-bit value comprises a first field of 32-bits and a second field of 32-bits for the second operand.

21. The instruction mechanism of claim 20, wherein the first field of 32-bits comprises U(0) bits and the second field of 32-bits comprises U(1) bits.

\* \* \* \* \*